Jan. 2, 1968   K. CECH   3,361,402
MICROPHONE MOUNT

Filed April 18, 1966   2 Sheets-Sheet 1

INVENTOR
CARL CECH
BY McGlew and Toren
ATTORNEYS

Jan. 2, 1968          K. CECH          3,361,402
MICROPHONE MOUNT
Filed April 18, 1966                    2 Sheets-Sheet 2
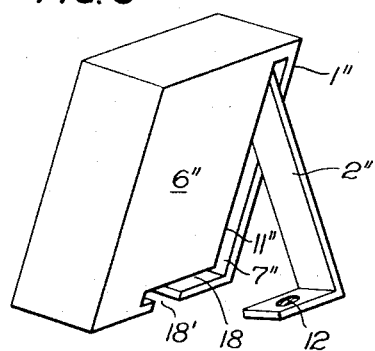
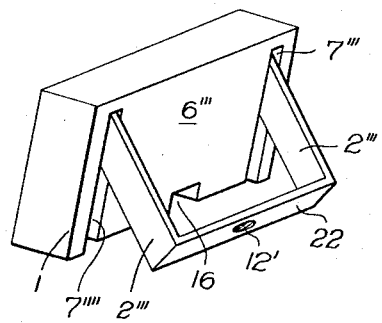
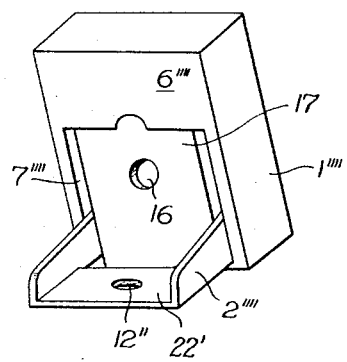
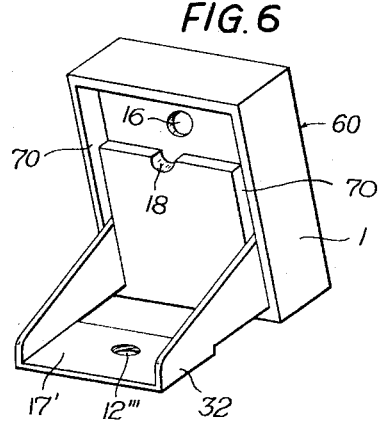
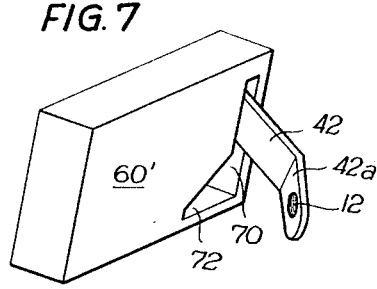
INVENTOR
CARL CECH
BY
ATTORNEYS & # United States Patent Office 3,361,402
Patented Jan. 2, 1968

3,361,402
MICROPHONE MOUNT
Karl Cech, Modling, Austria, assignor to Akustische U.
Kino-Gerate Gesellschaft m.b.H., Vienna, Austria
Filed Apr. 18, 1966, Ser. No. 543,293
Claims priority, application Austria, Apr. 26, 1965,
A 3,832/65
9 Claims. (Cl. 248—188)

This invention relates, in general, to microphone mount construction and, in particular, to a new and useful microphone housing and to a housing construction having a pivotal leg member for devices such as a microphone.

The present invention is particularly applicable to the construction of a housing for a microphone. The invention is an improvement over prior art devices in the provision of an inexpensive articulated mounting for the housing to permit it to be oriented on a table or mounted on a stand, for example. A feature of the construction is that the housing is formed with a slot in which is pivotally mounted a stand element which may be swung into the slot for storage and out of the slot for mounting the microphone in a desired fashion. In the preferred arrangement of the invention, the articulated stand element or leg is advantageously held in the slot by means of a resilient member which orients the inner end of the stand element for rotation about a pivotal construction formed in the housing. The leg element or stand may comprise a simple flat metal strip or a curved metal strip which may be formed of a pressure cast plastic material or a metal material and advantageously includes a leg portion which is provided with a tapered bore to permit threaded engagement of the leg member onto a table or other stand for example.

In one form of the invention, the slot of the housing is formed with a projection or protuberance and the leg member is formed with a corresponding recess on one side and a projection on the other. A spring member is thereafter engaged around the projection of the leg member and biased into the housing to urge the recess on the opposite side of the leg member into engagement over the protuberance formed on the housing. In this manner the leg member will rotate about the protuberance that will be biased at each position of its orientation.

In an alternate embodiment, the leg member is provided with a bore through which a resilient member extends and the resilient member is pressed against the walls formed on each side of the slot in the housing.

Accordingly, it is an object of the invention to provide an inexpensive microphone housing construction having a stand element which is pivotal into and out of a slot formation of the housing.

A further object of the invention is to provide a device for supporting a microphone housing and the like which includes a wall formation defining a slot in which is pivotally arranged a leg member with means for biasing the leg member at its pivotal location to permit fixing of the leg member at any desired orientation either in or out of the slot.

A further object of the invention is to provide a microphone housing which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 3 is a rear perspective view of another embodiment of a microphone housing;

FIGS. 4–7 are views similar to FIG. 3 of different embodiments of the invention.

Figure 1:
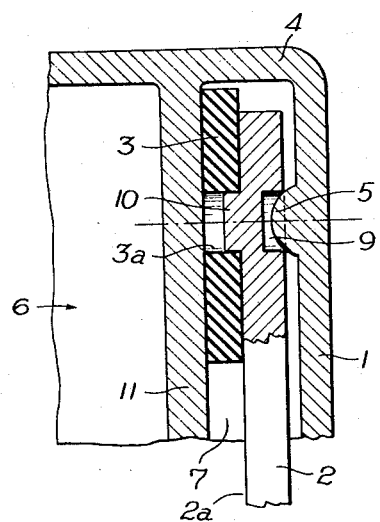
FIG. 1 is a transverse sectional view taken through a portion of a microphone housing having a mounting leg constructed in accordance with the invention.

Referring to the drawings, in particular, the invention embodied therein in FIG. 1 includes a microphone housing generally designated 6 having spaced walls 1 and 11 which define a slot 7 therebetween. The slot 7 is advantageously located adjacent one side or corner of the microphone housing.

In accordance with the invention, the slot 7 accommodates a leg or stand member 2 which is mounted adjacent its one end at or near the corner 4 for pivotal movement to permit it to be moved into and out of the slot 7 defined by the housing.

In accordance with a feature of the invention, the housing wall 1 is advantageously formed with projection or protuberance 5 which, as indicated, is in the form of a spherical segment which engages into a recess 9 formed adjacent the upper end of the leg member 2. The opposite side of the leg member 2 is provided with a projection which engages into a slot or opening 3a of a resilient member or spring member 3. The spring or resilient member 3 may advantageously be disc-shaped, square or rectangular and it resiliently bears against the wall 11 and a side face 2a of the leg member 2. In order to reduce cost, the resilent member 3 is advantageously made in the form of a circular ring and the leg 2 is formed with a projection 10 which engages centrally within the ring. The projection 10 serves for orienting and holding the resilient member in position and in the assembled condition, the resilient member 3 urges the leg 2 in a direction to seat on the projection 5 to permit pivotal rotation therearound.

The assembly operation for the leg or stand member 2 is very simple. It is merely necessary to place the resilient member 3 on the projection 10 and then to insert the leg 2 into the slot 7 until the protuberance 5 snaps into the depression or recess 9 formed on the leg 2. The resilient member 3 insures that the leg 2 will be held with sufficient friction in any desired position to which it has been pivotally moved either into or out of the slot. The housing 6 may be inexpensively manufactured of a material such as plastic or metal. If made of a plastic material, the mold may be designed so that the finished product can be easily removed from the mold.

Figure 2:
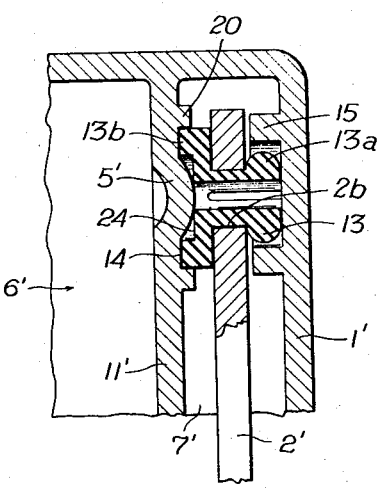
FIG. 2 is a view similar to FIG. 1 of another embodiment of the invention.

In FIG. 2 there is indicated a microphone housing 6' which includes parts which are correspondingly designated as in FIG. 1, but with the addition of a prime. In this embodiment the stand member or leg member 2' includes a bore 2b through which a resilient member 13 is inserted. In this embodiment the resilient member 13 constitutes a pivot for the leg member 2' and it is formed with a bulbous portion 13a which fits within a recess defined by an annular internal ledge 15 defined as a projection of the wall 1'. The opposite end of the resilient member 13 is provided with a squared portion or annular portion 13b which fits around a projection 5' and is held within a recess defined by an annular lip 20. The resilient member 13 constitutes both a pivot and a frictional drag element. The parts may be assembled by placing the leg member 2' with the resilient member 13 into the slot 7 and then deforming the wall 11' to form the inwardly formed projection 5'. However, it may also be assembled by making the member 13 sufficiently resilient so that it may be compressed to enter between the lip 20 and the ledge 15.

In the embodiment of FIG. 3, there is shown a housing 6″ in which a slot 7″ is formed with an L-shaped end portion 18 leading to a slotted opening 18′. The offset leg portion 2″ is provided with an opening 12 which is threaded for the purpose of inserting a securing bolt or some other element for fixing the leg 2″ on a stand, table or the like.

In the embodiment of FIG. 4, two slots 7‴, 7‴ are formed on the respective ends of the housing 6‴. The leg member 2‴ comprises two leg portions and a cross portion 22 and a recess 16 defined in the bottom of the housing to accommodate the projecting end of a stand element threaded through the cross portion 22. Cross portion 22 is provided with an opening 12′ for securing the cross portion to a suitable stand or table.

In the embodiment of FIG. 5, the housing 6⁗ is indicated which includes leg portions 2⁗ having a cross member 22′ which is accommodated in an indented portion 17 intermediate the length of the housing 6⁗. An opening 12″ aligns with an opening 16 defined in the housing in order to secure the leg 2⁗ in a retracted position if desired.

In the embodiment of FIG. 5, and also in the embodiment of FIG. 6 which shows a housing generally designated 60, the respective leg portions 2⁗ and 32, respectively, are formed so that they can be accommodated within the recesses defined in the housings 6⁗, 60 between each side slots 7⁗ and 70, respectively. In the embodiment of FIG. 6, the housing is provided with a recess 18 and a threaded bore 16 for securing the housing in position on a stand if so desired. In addition, the cross piece 17′ of the leg portion 32 is provided with an opening 12‴ for securing this position on a stand or table as desired.

In the embodiment of FIG. 7, a leg member 42 is provided which includes an angled portion 42a which fits into an angled portion 72 of a recess 70. The angled leg 42 permits the standing of the housing 60′ in either the position indicated in FIG. 7 or in an upright position, for example, with the end portion 42a bolted to a table or stand.

Figure 8:
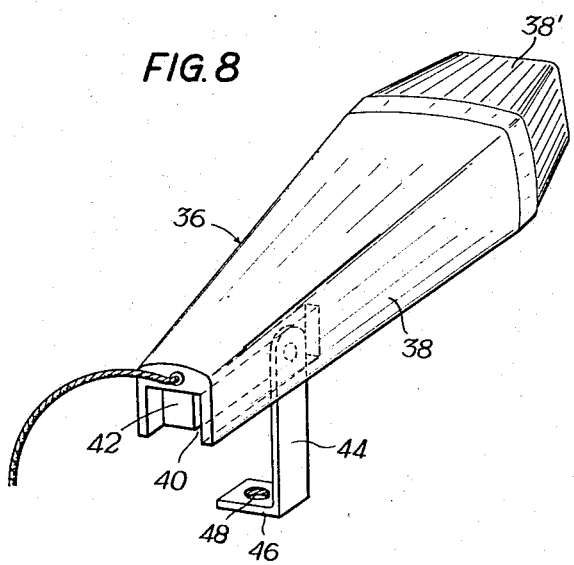
FIG. 8 is a rear perspective view of another embodiment of a mircophone housing constructed in accordance with the invention.

In FIG. 8 there is indicated a microphone generally designated 36 which includes a housing 38 having a slot 40 defined therein opening at the bottom of the housing 38 into a recess 42 of substantially rectangular configuration. The slot 40 and the recess 42 open on a bottom wall of the housing 38. In this construction, there is provided a leg member 44 which includes an angled bottom end 46 which fits into the recess 42 defined in the bottom of the housing 38. The recess 46 is provided with a threaded opening 48 to accommodate a screw or other device for bolting the leg member 44 to a stand, table or the like.

The microphone 36 will normally always be used on a stand so that the leg 44 need not act as a support on a plane surface. The front or mouthpiece 38′ of the housing is provided with the usual cover element to protect the transducer within the housing 38.

While specific embodiments of the invention have been shown and described in detail to illustrate the application of the inventive principles, it will be understood that the invention may be embodied otherwise without departing from such principles.

What is claimed is:

1. A microphone mount comprising a housing having at least one wall with an elongated slot defined therein, wall means defined along the interior of the slot providing a pivotal mounting, and a leg member accommodated within said slot and having an end adjacent to and engaged with the pivotal mounting and an end movable into and out of said slot by rotation about said pivotal mounting, and resilient means biasing said leg member against said pivotal mounting and permitting rotative movement of the opposite end of said leg member, said wall means defining said pivotal mounting includes a wall bounding said slot having a protuberance thereon about which said leg member is guided for pivotal movement, said leg member having a recess aligned over said protuberance defined on the wall of said slot.

2. A microphone amount according to claim 1, wherein said leg member has a projection on a side opposite from said recess which extends into an opening defined in said resilient means.

3. A microphone mount according to claim 1, wherein said leg member is substantially L-shaped, said slot being correspondingly shaped to accommodate said leg member.

4. A microphone mount according to claim 1, wherein said leg member is substantially U-shaped with two separate leg portions and a cross portion, said housing having two spaced slots for accommodating the respective legs of said leg member.

5. A microphone mount according to claim 1, wherein said leg member has a cross member accommodated within the bottom of said housing, said housing having a recess extending from said slot for accommodating said cross member.

6. A microphone mount according to claim 4, wherein said housing has a recess defined between said slots for accommodating a cross member intermediate the height of said housing.

7. A microphone mount according to claim 6, wherein said cross member includes a threaded bore for accommodating a bolt member of securing said cross member to a band.

8. A microphone mount according to claim 3, wherein said leg member includes an oblique portion, said slot being correspondingly shaped to accommodate the oblique portion of said leg member.

9. A microphone mount according to claim 1, wherein in said microphone housing includes a rear wall having a recess communicating with said slot, said leg member having a cross end portion accommodated within the recess of said rear wall when said leg member is in said slot.

References Cited

UNITED STATES PATENTS

| | | | |
|---|---|---|---|
| 1,180,295 | 4/1916 | Huss | 248—463 XR |
| 3,155,362 | 11/1964 | McCall | 248—359 |

JOHN PETO, *Primary Examiner.*